J. McCAMMON.
Grain-Drill.

No. 20,357.

Patented May 25. 1858

UNITED STATES PATENT OFFICE.

JOS. McCAMMON, OF DAYTON, OHIO.

IMPROVEMENT IN SEEDING-MACHINES.

Specification forming part of Letters Patent No. 20,357, dated May 25, 1858.

*To all whom it may concern:*

Be it known that I, JOSEPH McCAMMON, of Dayton, in the county of Montgomery and State of Ohio, have invented a new and Improved Seeding-Machine; and I do hereby declare that the following is a full, clear, and exact description of the same, reference being had to the annexed drawings, making a part of this specification, in which—

Figure 1:
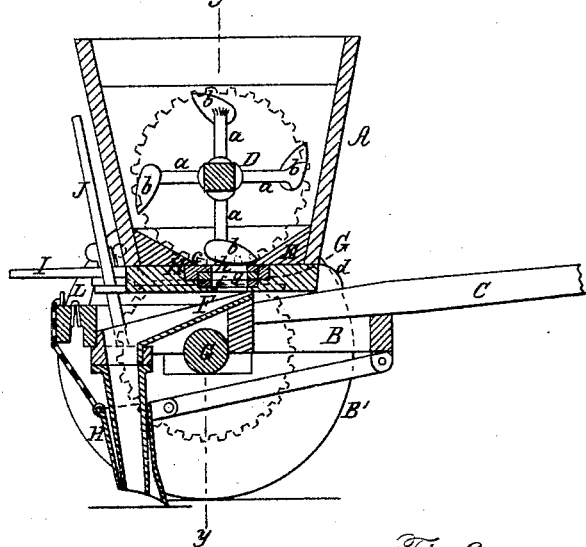
Figure 2:
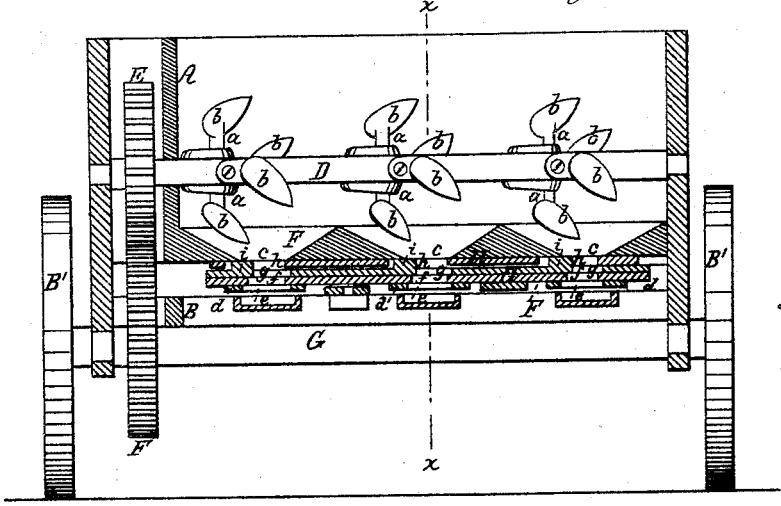
Figure 3:
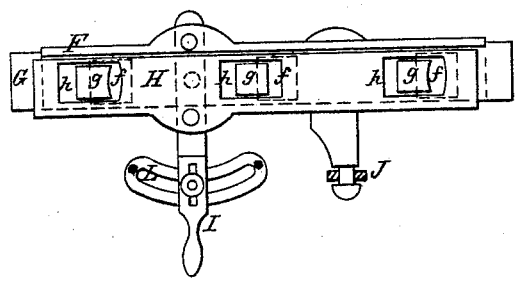

Figure 1 is a transverse vertical section of my improvement, taken in the line $x\ x$, Fig. 2. Fig. 2 is a longitudinal vertical section of the same, taken in the line $y\ y$, Fig. 1. Fig. 3 is a detached plan or top view of the adjustable slides which contain the discharge-apertures.

Similar letters of reference indicate corresponding parts in the several figures.

This invention consists in a peculiar means employed for distributing the seed, as hereinafter fully shown and described, whereby the seed is prevented from arching and packing in the hopper or seed-box and presented in a proper manner to the discharge-apertures, the size of which may be graduated so as to sow a greater or less quantity of seed on a given area or space.

To enable those skilled in the art to fully understand and construct my invention, I will proceed to describe it.

A represents a hopper or seed-box, which is placed on a frame or bed, B, mounted on wheels B′ B′.

C is the draft-pole, which is attached to the frame or bed B. The hopper or seed-box extends the whole width of the frame or bed B, and a shaft, D, is placed longitudinally within the hopper or seed-box, said shaft having a toothed wheel, E, on one end of it, which wheel gears into a wheel, F, on the axle G. The shaft D therefore is rotated from the axle G by means of the gearing E F.

To the shaft D a series of radial arms, $a$, are attached, and to the outer end of each arm $a$ an oblique blade, $b$, is attached. These blades $b$ have their outer surfaces slightly convex or rounded, and their inner surfaces may be of similar form, the blades being slightly curved longitudinally. Any number of these blades may be used. They are attached to the shaft in pairs—that is, two placed at opposite sides of the shaft—the several pairs projecting alternately from different sides of the shaft, which is of quadrilateral form. (See Fig. 1.) The blades $b$ and arms $a$ may be of metal cast in one piece.

The bottom E of the hopper has apertures $c$ made through it, and the bottom is made concave, surrounding each aperture, so that the seed will have a tendency to pass toward the apertures. This is clearly shown in Figs. 1 and 2. The blades $b$ rotate over the apertures $c$ and within a short distance of them.

To the under side of the bottom E of the hopper guides $d$ are attached. Said guides extend across the bottom E in line with the apertures $c$. These guides have each an aperture, $e$, said apertures corresponding in size with the apertures $c$ in the bottom E of the hopper.

F G H are three slides which pass through the guides $d$, and are allowed to work back and forth in the guides. These slides have holes made through them. The holes or apertures $f\ g$ of the two lower slides, F H, are about of equal size; but the holes $h$ of the uppermost slide, H, are considerably larger than those of the other two slides. The central slide, G, has projections $i$ on its upper surface, said projections fitting in the apertures $h$ of the slide H, the upper surfaces of said projections being flush with the upper surface of the slide H. The slide H has a lever, I, connected to it, and the slide F has a lever, J, attached. (See Fig. 3.)

From the above description of parts it will readily be seen that that the discharge-apertures may, by actuating the levers and thereby adjusting the slides, be contracted as desired, so that a greater or less quantity of seed may escape from the hopper or seed-box and the desired quantity sown on a given space or area. It will also been that as the machine is drawn along and the shaft D rotated the blades $b$ will agitate the seed in the hopper, preventing it from packing therein, and forming an arch over the discharge-apertures. The blades also serve to regulate the discharge of the seed in consequence of a downward pressure they exert upon the seed while passing over the apertures.

I would remark that the usual conveying-tubes, K, are employed, and that the levers I J, one or both, may work over graduated plates L, so that the discharge-apertures may be regulated with certainty.

I do not claim separately the adjustable slides F G H, having apertures made through them, and attached to the under side of the hopper for the purpose of varying the size of the discharge-apertures, for they have been previously used; but,

Having thus described my invention, what I claim as new, and desire to secure by Letters Patent, is—

1. The blades $b$, attached to the rotating shaft D, which is placed within the hopper or seed-box A, and arranged substantially as set forth.

2. In combination, the adjustable slides F G H and concave bottom E, the whole being arranged to operate as and for the purpose set forth.

JOSEPH McCAMMON.

Witnesses:
J. A. JORDAN,
I. M. JORDAN.